United States Patent [19]

Marchant

[11] Patent Number: 5,221,109
[45] Date of Patent: Jun. 22, 1993

[54] AIRBAG INFLATOR HAVING VENTS TO TERMINATE INFLATION

[75] Inventor: Brent R. Marchant, Ogden, Utah

[73] Assignee: Morton International, Inc., Chicago, Ill.

[21] Appl. No.: 919,356

[22] Filed: Jul. 23, 1992

[51] Int. Cl.⁵ .............................................. B60R 21/26
[52] U.S. Cl. .................................. 280/736; 280/741; 102/530; 422/166
[58] Field of Search ............. 280/736, 739, 740, 741, 280/742; 102/530, 531; 422/164, 165, 166

[56] References Cited

U.S. PATENT DOCUMENTS

| | | | |
|---|---|---|---|
| 3,768,833 | 10/1973 | Broucksou | 280/740 |
| 3,787,067 | 1/1974 | Bernard | 280/736 |
| 3,843,152 | 10/1974 | Nonaka | 280/739 |
| 3,847,412 | 11/1974 | Mattson | 280/736 |
| 3,861,712 | 1/1975 | Matsui et al. | 280/735 |
| 3,884,499 | 5/1975 | Oka et al. | 280/735 |
| 4,817,828 | 4/1989 | Goetz | 222/3 |
| 4,950,458 | 8/1990 | Cunningham | 422/164 |
| 4,998,751 | 3/1991 | Paxton et al. | 280/741 |

Primary Examiner—Tamara L. Graysay
Attorney, Agent, or Firm—George W. Rauchfuss; Gerald K. White

[57] ABSTRACT

An air bag inflator responds to signals from a diagnostic unit to terminate filling of the bag prior to full inflation. This is accomplished by a piston propelled by a secondary charge which is ignited by a second signal from the diagnostic unit. The piston blocks the air bag inflation passages and simultaneously opens vents to discharge the remaining inflation gas.

4 Claims, 2 Drawing Sheets

AIRBAG INFLATOR HAVING VENTS TO TERMINATE INFLATION

TECHNICAL FIELD

This invention is in the field of inflators for airbags of vehicle occupant restraint systems.

BACKGROUND ART

The present invention relates to an apparatus for generating gas to inflate the airbag of a vehicle occupant restraint system. It is well known in these systems to employ a gas generating explosive charge which is triggered by a diagnostics unit on the vehicle which measures the severity of a crash. When the crash is sufficiently severe, the charge is ignited.

Airbags are quite effective in protecting vehicle occupants from injury. However, they do have certain inherent drawbacks. When the severity of the crash is high, the rapid inflation is an important safety feature. However, when the crash is of somewhat intermediate severity, less energy is needed to inflate the airbag.

Accordingly, it is a primary object of the present invention to provide an airbag inflation system which is time metered. By this it is meant that initiation of the bag inflation begins in the conventional manner. However, if the crash diagnostics system senses that the crash is of intermediate severity, airbag inflation is caused to cease prior to full inflation. Other objects, features and advantages will become apparent from the following description and appended claims.

DISCLOSURE OF INVENTION

The invention comprises method and apparatus providing ignition of a primary charge to initiate airbag inflation. However, when the diagnostic unit senses a crash of intermediate severity, a second charge is caused to ignite. The inflator is designed in such a manner that the second charge shuts off the gas passage between the main charge and the airbag.

BEST MODE FOR CARRYING OUT THE INVENTION

Figure 1:
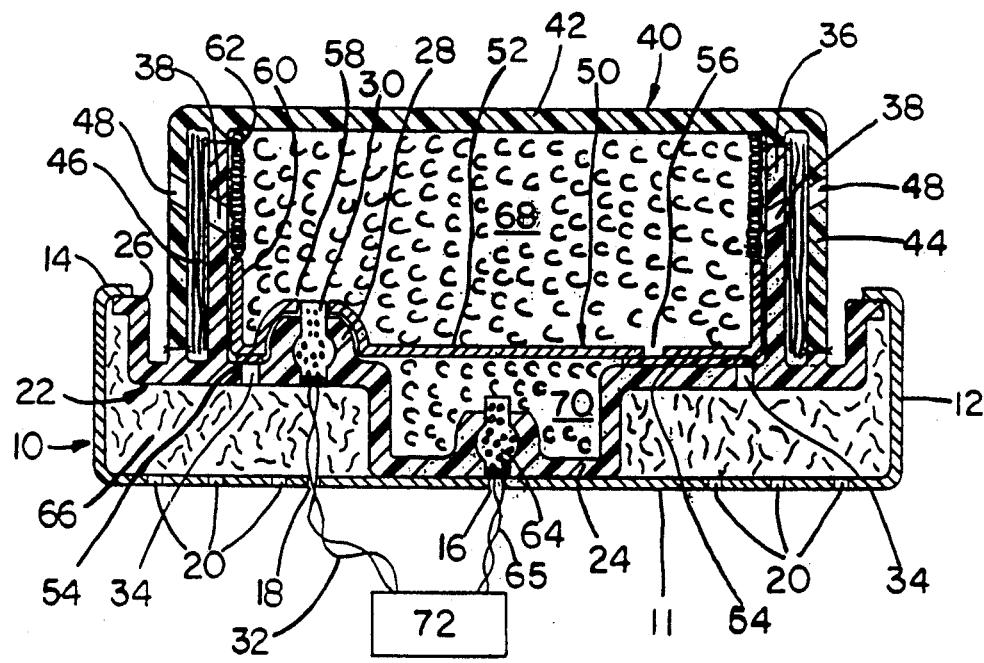
FIG. 1 is a vertical cross section through an airbag inflator in accordance with the present invention.

With particular reference to FIG. 1, there is illustrated an igniter assembly in accordance with the present invention. It comprises a sheet metal base 10 in the form of a circular pan having a cylindrical sidewall 12 terminating in an inwardly turned circumferential flange 14. The bottom 11 of the base 10 includes a central wiring opening 16, an offset wiring opening 18, and a plurality of vent holes 20.

Mounted within the base 10 is a combustion cylinder 22. The combustion cylinder is essentially in the form of a disk having a depending central well 24 which rests upon the bottom 11 of the base 10. The combustion cylinder 22 includes a circumferential rim 26 which is captured and retained by the flange 14. The main disk body portion of the combustion cylinder 22 includes a boss 28 which carries a primary igniter squib 30. The igniter wires 32 of the primary squib 30 extend through the wire opening 18 of the bottom 11 of base 10. The main disk portion of the combustion cylinder 22 also carries a circular array of vent holes 34 which communicate with the interior of the base 10.

Extending upwardly from the main disk portion of the combustion cylinder 22 is a circular sidewall 36. A circular array of diffuser holes 38 extends through the sidewall 36.

A cover 40 in the shape of an inverted bowl is mounted over the combustion cylinder. The flat top surface 42 of the cover 40 forms a first end wall which engages the top edge of the sidewall 36 and the edge of its sidewall 44 engages an extension of the main disk body portion, or second end wall of the combustion cylinder 22. It will be noted that the sidewall 44 is spaced from the sidewall 36 of the combustion cylinder. The intermediate space is filled with a suitable gas filter means 46. The sidewall 44 of the cover 40 also defines diffuser holes 48 which may be aligned with, and form continuations of, the diffuser holes 38 in the sidewall 36 of the combustion cylinder.

Positioned within the combustion cylinder 22 is a cup-shaped piston 50. The piston 50 has a circular base 52 which rests upon a gasket 54 in the combustion cylinder 22. The base 52 defines a plurality of vent holes 56 which are normally blocked by the gasket 54 and are spaced from the vent holes 34 in the combustion cylinder. As will be clear from FIG. 1, the base 52 normally spans the well 24 in the combustion cylinder 22 and also includes an opening 58 for the squib 30. The piston 50 has a cylindrical sidewall 60 which is adjacent the sidewall 36 of the combustion cylinder. However, as will be noted in FIG. 1, the upper edge of the piston sidewall 60 is normally positioned below the diffuser holes 38 in the sidewall 36. A combustion screen 62 extends around the interior of the sidewall 36 and covers the diffuser holes 38. Its lower edge is either closely adjacent, or rests against, the upper edge of the piston sidewall 60.

A secondary squib 64 is mounted in the bottom of the well 24 and the space around the well 24 is filled with a loose packed screening material 66. The primary ignition charge 68 is carried within the space between the piston 50 and the top surface 42 of the cover 40. A secondary ignition charge 70 fills the well 24.

The igniter wires 32, 65 are illustrated schematically as connected to a diagnostics unit 72 of a type known to the art. The diagnostic unit senses the severity of the crash and sends the required electrical signals to ignite the squibs.

Operation

When the diagnostics unit 72 senses a crash of sufficient magnitude for airbag inflation, it generates an ignition current over igniter wires 32 to squib 30 which ignites the primary charge 68. Upon ignition, the primary charge 68 generates gases which pass through the combustion screen 62, the diffuser holes 38, 48 and through the intermediate gas filter 46 into the airbag (not shown). This much of the operation is conventional and in accordance with the prior art.

Figure 2:
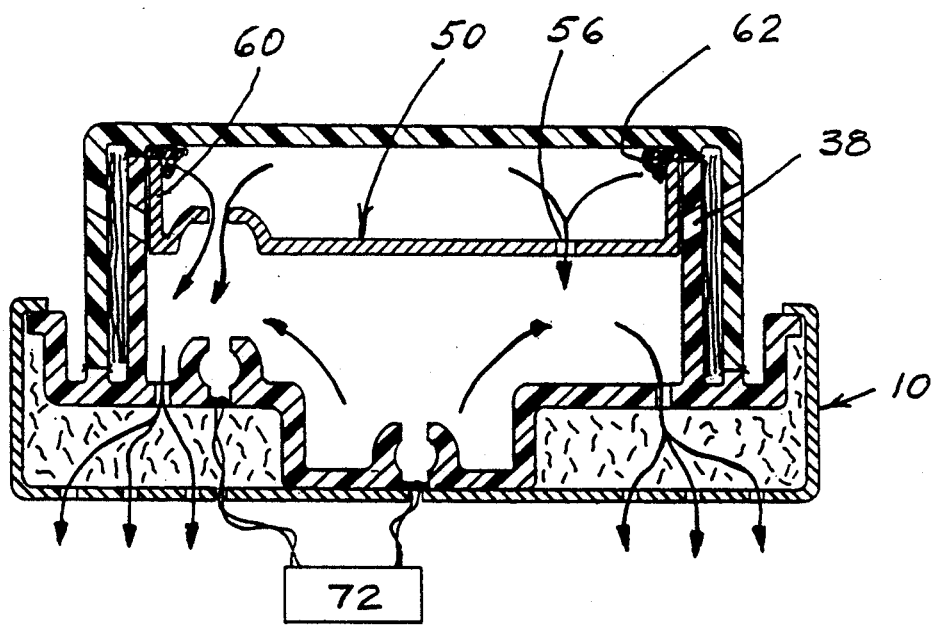
FIG. 2 is a view similar to FIG. 1 illustrating the operation of the system.

If the diagnostics unit 72 senses that the crash is not of a severity requiring full deployment of the airbag, it generates a second ignition current over igniter wires 65 to secondary squib 64. This ignites the secondary ignition charge 70. The operation thereafter is best illustrated in FIG. 2.

The explosion of the secondary ignition charge 70 forces the piston 50 upwardly within the combustion cylinder 22. As the piston 50 rises, the top edge of the sidewall 60 crushes the combustion screen 62. The sidewall 60 covers the diffuser holes 38, thereby cutting off the flow of gas from the primary charge 68 into the airbag. At the same time, the vent holes 56 in the base 52 of the piston leave the gasket 54 and the pressure of the exploding charge blows the gasket, thereby opening the vents 34. As a result, the gas flows, as illustrated by the arrows in FIG. 2, through the loosely packed screening material 66 and out the vent holes 20 in the bottom of base 10, thereby terminating airbag inflation.

Figure 3:
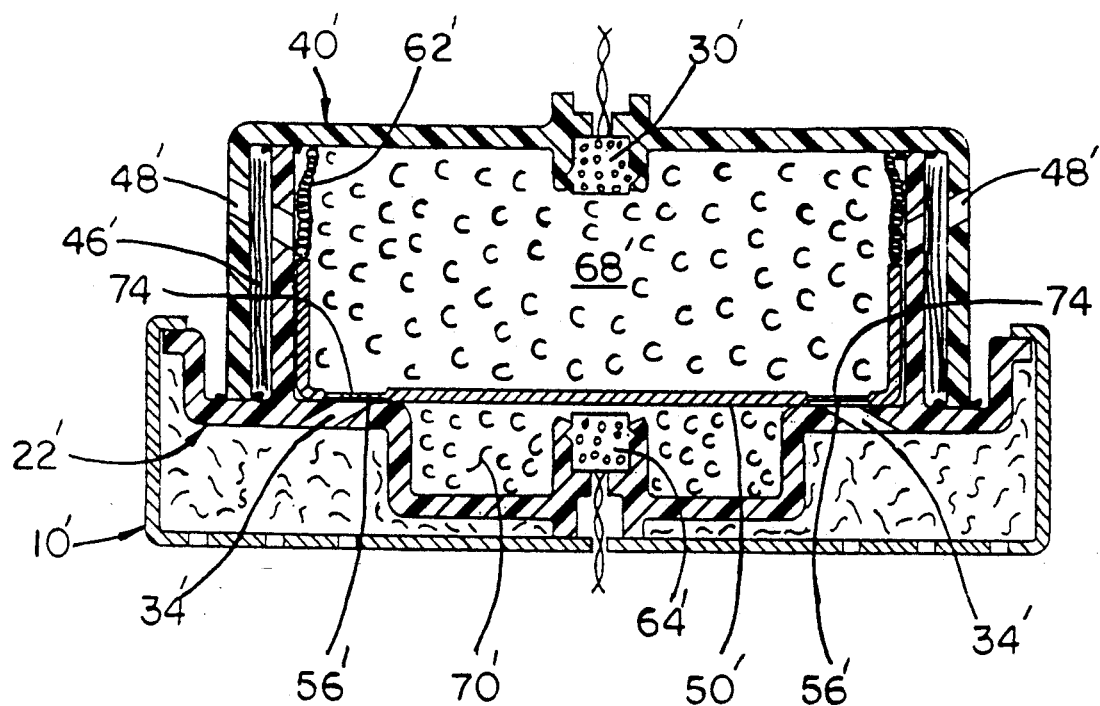
FIG. 3 is a similar view illustrating a modified form of the inflator.

A modified version of the inflator is illustrated in FIG. 3. The principle of operation is essentially the same and parts are given similar numbers but with a prime (') attached. In this modification the primary squib 30', is mounted on one side of the assembly and the secondary squib 64', is mounted on the other. Another distinction is that the vents 34', need not be spaced from the vent holes 56', and piston 50'. However, the latter are closed by burst disks 74 designed to open by an explosion occurring below the piston 50', as viewed in FIG. 3.

It is believed that the many advantages of this invention will now be apparent to those skilled in the art. It will also be apparent that a number of variations and modifications may be made in this invention without departing from its spirit and scope. Accordingly, the foregoing description is to be construed as illustrative only, rather than limiting. This invention is limited only by the scope of the following claims.

I claim:

1. A gas generator for inflating the air bag of a vehicle occupant restraint system which comprises:
   a cylinder having first and second spaced end walls, first vent openings defined by the second end wall, a side wall interconnecting the end walls, and gas passages through said side wall for inflating said air bag;
   a substantially cup-shaped piston within said cylinder having a base normally resting against said second end wall and closing said first vent openings, said base defining second vent openings normally closed by said second end wall, and a piston side wall adjacent the cylinder side wall and normally positioned to leave said gas passages open;
   a primary gas-generating charge contained within a space enclosed between said piston and the first end wall of the cylinder;
   means for selectively activating said primary charge to produce and force gas through said gas passages;
   a secondary gas-generating charge contained between the second end wall of the cylinder and the base of the piston; and
   means for selectively activating said secondary charge after activation of said primary charge to force said piston inwardly of said cylinder to close said gas passages and open said first and second vent openings.

2. The gas generator of claim 1 wherein each of said gas passages is covered by a filter element.

3. The gas generator of claim 2 wherein said filter element is positioned to be crushed by the inwardly moving piston.

4. The method of controlling the degree of inflation of an air bag of a vehicle occupant restraint system in response to crash severity which comprises:
   providing an enclosure having first and second chambers, each containing a gas-producing charge, and a movable piston element therebetween;
   providing gas passages between said first chamber and said air bag;
   providing gas openings through said piston element;
   providing vents to atmosphere from said second chamber;
   igniting the charge within said first chamber;
   causing the gas produced by ignition of the charge within said first chamber to enter said air bag through said gas passages and simultaneously seal said openings and vents;
   thereafter igniting the charge within said second chamber; and
   causing the gas produced by ignition of the charge within said second chamber to advance said piston element to seal said gas passages and open said openings and vents to terminate inflation of the air bag.

* * * * *